Patented May 7, 1935

2,000,244

UNITED STATES PATENT OFFICE 2,000,244

PROCESS FOR SEPARATION AND RECOVERY OF NAPHTHENIC ACIDS AND PHENOLS

David R. Merrill, Long Beach, and Arthur L. Blount, Wilmington, Calif., assignors to Union Oil Company of California, Los Angeles, Calif., a corporation of California No Drawing. Application July 25, 1933, Serial No. 682,106

18 Claims. (Cl. 260—108)

This invention relates to processes for the recovery of naphthenic acids and phenols in a high state of purity and is particularly applicable to petroleum extracts and distillates which constitute suitable sources for the separation and purification of both the naphthenic and phenolic constituents.

The object of the invention principally is to present a process by means of which the naphthenic acids may be recovered free from admixed phenolic material and the phenolic material free from admixed naphthenic acids.

It is another object of this invention to present a process whereby both the phenolic materials and naphthenic acids may be recovered and purified without substantial loss of either and with the minimum amount of labor and expenditures of chemicals.

In earlier methods for treatment and recovery of similar materials, no means has been provided for the recovery of the phenols. According to the present invention petroleum extracts obtaining naphthenic acids and phenols are extracted with a caustic soda or caustic potash solution of suitable concentration. The alkaline solution containing the naphthenates and phenolates formed from the naphthenic acids and phenols originally present in the petroleum extract is separated from the latter. It is next partially acidified thus causing a separation of an oily layer which contains some petroleum extract, some free naphthenic acids and a relatively large amount of sodium naphthenates, and free phenolic materials. The above mentioned oily layer is neutralized carefully as by means of sodium carbonate or sodium hydroxide so as to neutralize only the naphthenic acids and to avoid neutralization of the phenols. Into the so neutralized oily layer there is introduced Edeleanu extract, such as might be produced by the liquid SO₂ treatment of kerosene, or any analogous material whose function is to prevent foaming during the dehydration step which is accomplished by heating or distillation without the use of steam. The distillation is continued beyond the dehydration stage, with steam, to remove the oil and phenols. The residue is then steamed at decreasing temperature in order to obtain a solution of naphthenic acid soaps, which solution is then acidified to liberate the naphthenic acids therefrom. The phenols, which were removed as an overhead during the distillation step, are purified by extracting the oily overhead with excess caustic soda solution, followed by acidification of the resulting solution to liberate the phenols, and finally by distillation of the separated phenols over sodium carbonate.

Briefly stated, our invention resides in the steps of carefully neutralizing an acidified mixture of phenols and naphthenic acids in such a manner that the pH of the resulting reaction product is such that substantially only the naphthenic acids are saponified while the phenols are not neutralized, or only to a small extent. The invention also resides in such a process where the neutralized oily layer is distilled in order to expel the oil and phenols and thereby separate them from the naphthenates, and whereby the phenols and naphthenates may be separately purified and recovered. The invention further resides in the employment of materials such as Edeleanu extract for the purpose of preventing foaming during the subsequent heating of the neutralized oily layer wherein dehydration and the mentioned distillation are effected.

Considering the process in greater detail, we have found that naphthenic acids are preferentially extracted from petroleum fractions by sulfur dioxide, (or analogous materials such as furfural, nitrobenzene, etc.), and that the fraction thus removed by a sulfur dioxide extraction of petroleum distillates such as gasoline and kerosene contains a higher concentration of naphthenic acids and phenols than the original distillate. When this fraction is washed with caustic soda solution the naphthenic acids and phenols are obtained in the alkaline medium in the form of naphthenates and phenolates. Upon acidification of this spent alkali an oily phase is obtained which consists largely of the naphthenic acids and phenolic materials which were removed from the petroleum distillates by the sulfur dioxide extraction process. It is preferred to work on these sulfur dioxide extracts because of the larger yield of the desired materials in the oily phase. However, a similar spent alkali solution containing both naphthenic acids and phenols is obtainable by direct extraction of various distillates with aqueous alkali without a previous sulfur dioxide extraction.

In either case if a spent alkali solution, obtained from treating either the extract from the sulfur dioxide extraction of kerosene or similar distillates, or from the direct treatment of a crude oil distillate, is partially acidified, a separation of oily material occurs which consists of the phenolic materials, naphthenate salts, a small amount of free naphthenic acids and some accompanying mineral oil. It is important that sufficient acid be used so that all the phenolates are converted into corresponding free phenolic materials. It has been found practical to use sufficient sulfuric acid to produce an oily layer with an organic acid number of approximately 50 (mg. potassium hydroxide per gram of material) when using phenolphthalein as an indicator. This gives a solution with a hydrogen ion concentration equivalent to a pH value of 8. An oily layer separates from this partially acidified spent alkali solution, which is recovered for further treatment, the aqueous phase being discarded, since both the phenolic and naphthenic constituents are retained in the oily layer.

The term acid number, appearing above, means the number of milligrams of potassium hydroxide, KOH, required to neutralize one gram of the material.

To the oily layer there is added sufficient sodium carbonate to neutralize the organic acidity and provide only a slight excess. Instead of sodium carbonate, sodium hydroxide may be employed in very carefully limited amounts calculated so as to obtain bare neutralization of the mineral acids and naphthenic acids and avoid a conversion of the phenolic materials present to sodium phenolates.

Having now obtained both the naphthenic and phenolic constituents in a single fraction containing substantially no other constituent except some accompanying oily fractions, the next step is directed towards the separation of the phenols from the naphthenates. For this purpose a quantity of Edeleanu extract or analogous material such as coal tar solvent naphtha which contains xylenes and heavier aromatic compounds is added to the neutralized oily layer. The amount of the extract which may be used varies; however, about 25 to 50% has been found to be suitable in most cases.

This extract may be obtained by the treatment of petroleum distillates with liquid sulfur dioxide and contains a relatively large amount of the aromatic and unsaturated compounds which were present in the original distillate and it therefore possesses good solvent properties. This extract may be the same as that from which the phenols and naphthenic acids were obtained by the above described acidification and neutralization. The function of the Edeleanu extract (or analogous material) added is to prevent foaming during subsequent heating by dissolving the mixture of water, sodium naphthenates, free phenolic materials, free naphthenic acids, and petroleum oils at a temperature below the boiling point of water from the solution. By producing a homogeneous solution of relatively low viscosity, the evolution of bubbles of steam in the dehydration operation is facilitated. This heating, which is the next step, is for the purpose of dehydrating the mixture and consists in heating the mixture without steaming until a temperature around 250° F. is attained. The next stage consists in elevating the temperature for the removal of the oil, Edeleanu extract and the phenols. This stage is started by introduction of saturated or superheated steam, the fire under the still is then rapidly increased until a temperature of 550 to 600° F. is obtained and the final ratio of the oil to water in the distillate is about 1:10. The fire is then shut off and the steaming continued without superheat until the temperature of the still falls to that of the saturated steam. If desired, the mixture may be further cooled to below the boiling point of water. Thereafter water is added and the mixture agitated with a small amount of steam so as to obtain a concentrated aqueous solution of the residual soaps.

The resultant aqueous solution of sodium naphthenates which now is free from phenols is subsequently acidified with sulfuric acid or other appropriate mineral acid in any manner well understood, in order to liberate the free naphthenic acids. The latter may then be purified by filtration, centrifugal separation or distillation. The acids thus dehydrated and purified have relatively high acid numbers in comparison with crude acids separated from the original spent alkali by the original acidification with sulfuric acid. For example, such crude acids from alkali used in neutralizing Edeleanu kerosene extract have been found to have acid numbers ranging from 200 to 225 (200 to 225 mg. potassium hydroxide per gram of material), whereas the dephenolated purified naphthenic acids have been found to have acid numbers between 280 and 290. These dephenolated naphthenic acids may be further treated with 5% of a 30% hydrogen peroxide solution at 200° F. for a short time, which treatment causes the resulting product to possess a color of approximately 1 NPA, or in certain cases even better. A similar color may be obtained at atmospheric temperature by treating the crude acids with a 10 to 20% of a hypochlorite solution containing 30% available chlorine. Any remaining traces of the decolorizing agents set out above may be removed by treating the light colored naphthenic acids with a reducing agent such as sodium thiosulphate. Another characteristic feature of the naphthenic acids which has been produced according to the herein described process is their ability to retain their light color even on standing for long periods of time.

In order to obtain the phenolic materials in relatively pure form from the mixture of oil and phenolic materials which was carried over during the steam distillation step above described, the following procedure has been followed. The oil and phenol mixture is washed with a slight excess of 12° Bé. caustic soda solution to convert the phenolic material and a small quantity of naphthenic acids present in the oil into the water-soluble sodium phenolates and sodium naphthenates. It has been our experience to find something over 50% by volume of the mixture to be soluble in caustic soda. The caustic solution is then acidified, whereby the crude phenolic materials are obtained as an oily phase. This phase is purified by distillation over excess sodium carbonate. The purpose of this step is to remove the free phenolic material as an overhead product and retain the admixed naphthenic acids in the still bottom as sodium naphthenates from which the free naphthenic acids may be obtained by the addition of sulphuric acid and subsequent purification as set out above. Upwards of 70% has been found to come over as a phenolic fraction between 400 and 470° F. The remainder, aside from a few percent of water is fixed by the sodium carbonate and represents naphthenic acids (as sodium naphthenates) which came over during the steam distillation referred to above. These phenolic materials consist chiefly of xylenols, ethylphenols, propylphenols and isomers of propylphenols. The distillates obtained from distillation over the sodium carbonate are completely soluble in caustic soda, have colors ranging from 2 to 7 NPA and have negligible acid numbers. They may be considered therefore as mixtures of higher phenols of relatively high purity.

The agents which were added to the mixture of sodium naphthenates and phenols for the purpose of obtaining an even ebullition thereof have been disclosed to be an Edeleanu extract from a kerosene fraction or a coal tar naphtha, containing xylenes and heavier aromatic compounds. We wish to state that any organic solvent, preferably of an aromatic nature which has a sufficiently high boiling point may be used for this purpose, although from an economical standpoint the above mentioned extract is to be preferred.

The naphthenic acids which may be prepared according to this invention are of a high state of purity and may be used for many purposes for which the acids produced by any of the so far known processes are unsuitable. Thus, they may be readily used for the preparation of antiseptics in which the presence of phenols would be highly undesirable, and also may find application in the manufacture of cosmetics.

The phenols which are obtained as a pure, separate product, as described above, are useful starting materials for the manufacture of antiseptics, salicylic acid, dye stuff intermediates such as phenacetin or its homologues, paint and varnish removers, synthetic resins and plastics. They are of such a degree of purity that no subsequent purification is necessary.

The term N. P. A. color referred to in this specification relates to a color grade of a liquid obtained by means of the Union Petroleum Company colorimeter adapted as a standard by the National Petroleum Association in 1915. A detailed description of the apparatus, method of test and significance of the scale readings is found in David T. Day, Handbook of Petroleum Industry 1922, vol. I, page 665. For example, N. P. A. 0.5 indicates a light, almost white color, N. P. A. 3 a yellow to straw color and N. P. A. 7 or 8 a dark reddish to brown color.

The temperatures and quantities of the various reagents used in the process are not to be considered as limitations of the invention herein set forth as many variations which are obvious to those skilled in the art may be made within the scope of the appended claims.

We claim:

1. A process for the recovery of naphthenates from a mixture comprising naphthenic and phenolic materials which comprises adding a neutralizing agent to said mixture to convert the naphthenic material into naphthenates without any substantial conversion of the phenolic materials into phenolates, distilling the mixture containing naphthenates and phenols and thereby separating the phenols from the naphthenates.

2. A process as claimed in claim 1 in which the neutralizing agent is sodium carbonate.

3. A process for the recovery of naphthenates from a mixture comprising naphthenic and phenolic materials which comprises adding a neutralizing agent to said mixture to convert the naphthenic material into naphthenates without any substantial conversion of the phenols into phenolates, adding an organic solvent medium of sufficiently high boiling point to prevent foaming to the mixture containing naphthenates and free phenolic materials and then distilling the mixture of naphthenates and phenolic materials to remove the phenolic materials as a distillate.

4. A process as claimed in claim 3 in which the organic solvent medium is a petroleum fraction soluble in liquid sulphur dioxide.

5. A process for the separation of naphthenic materials from phenolic materials from a mixture containing the same which comprises distilling said mixture in the presence of a sufficient amount of alkali to convert the naphthenic material into naphthenates but in an amount insufficient to convert the phenolic materials into phenolates and collecting the phenolic materials as a distillate fraction.

6. A method for separating phenolic materials from naphthenic materials contained in petroleum fractions which comprises extracting the petroleum fraction with alkali to produce naphthenates and phenolates, acidifying the extract with a mineral acid, recovering the resultant oily layer with its contained naphthenic acids and phenols, neutralizing the oily layer to obtain naphthenates without neutralization of the phenols, recovering the resultant oily layer with its contained phenols and naphthenates, and separating the phenols from the naphthenates by distillation.

7. In a method for separating phenolic materials from naphthenic materials the steps of extracting said phenolic and naphthenic materials from a petroleum fraction by means of a selective solvent for the phenolic and naphthenic material, removing the selective solvent from the phenolic and naphthenic materials, adding sufficient alkaline material to the mixture of naphthenic and phenolic material to convert the naphthenic material into naphthenates but in an amount insufficient to convert the phenolic material into phenolates and subsequently separating the phenolic material from the naphthenic material by distillation.

8. A method for separating phenolic materials from the naphthenic materials contained in petroleum fractions which comprises extracting the petroleum fraction with liquid sulphur dioxide, extracting the extract so obtained with alkali to produce naphthenates and phenolates, acidifying the resulting extract with a mineral acid, recovering the resultant oily layer with its contained naphthenic acids and phenols, neutralizing the oily layer to obtain naphthenates without neutralization of the phenols, recovering the resultant oily layer with its contained phenols and naphthenates and separating the phenols from the naphthenates.

9. A method according to claim 6 wherein the phenols are separated from the naphthenates by distillation of the phenols.

10. A method according to claim 6 wherein the separation of the phenols and naphthenates comprises the additional steps of adding an organic solvent medium of sufficiently high boiling point to the neutralized oily layer to prevent subsequent foaming, and distilling to expel the oil and phenols, the naphthenates being retained in the bottoms.

11. A method according to claim 6 wherein the separation of the phenols and the naphthenates comprises the additional steps of adding an Edeleanu extract to the neutralized oily layer to prevent subsequent foaming and distilling to expel oil and phenols, the naphthenates being retained in the bottom.

12. A method for separating phenols and naphthenic acids from petroleum fractions comprising neutralizing an acid fraction containing phenols and naphthenic acids to obtain naphthenates and to avoid neutralization of the phenols, and separating the phenols from the naphthenates by distillation.

13. A method for separating phenols and naphthenic acids from petroleum fractions comprising neutralizing an acid fraction containing phenols and naphthenic acids to obtain naphthenates and to avoid neutralization of the phenols, and separating the phenols from the naphthenates by distilling up to a temperature of approximately 600° F. to expel the phenols.

14. A method for separating naphthenic acids from phenols contained in a petroleum fraction comprising neutralizing an acid fraction containing phenols and naphthenic acids to obtain naphthenates and to avoid neutralization of the phenols, separating the resultant oily layer containing the phenols and naphthenates, adding an oily fraction to such separated layer to prevent subsequent foaming and distilling off the oil and phenols.

15. A method according to claim 14 and the additional steps of purifying the phenolic materials carried over in the distillate by washing the distillate with an excess of caustic soda solution, based on its phenol and naphthenic acid content, collecting the wash liquor, acidifying the wash liquor to liberate the phenols and any naphthenic acids as an oily phase, distilling this oily phase over sufficient sodium carbonate to hold back any naphthenic acids in the still bottoms as sodium naphthenates and collecting the phenolic fraction distilling over 400° F.

16. A process as claimed in claim 7 in which the selective solvent is sulphur dioxide.

17. A method for separating phenolic material from naphthenic materials contained in petroleum fractions which comprises extracting the petroleum fractions with alkali to produce naphthenates and phenolates, acidifying the extract with a mineral acid, recovering the oily layer with its contained naphthenic acids and phenols, neutralizing the oily layer to obtain naphthenates without neutralizing the phenols, adding an Edeleanu extract to the neutralized oily layer to prevent subsequent foaming, distilling the mixture so obtained to expel the oil and phenolic materials, separating the phenols from the overhead fraction by washing it with an alkali solution, acidifying the alkaline wash liquor to liberate the phenols as an oily phase, distilling the said oily phase over sufficient sodium carbonate to hold back any naphthenic acids in the still bottoms as sodium naphthenates and collecting the phenolic distillates substantially free from admixture.

18. A method for separating phenolic materials from the naphthenic materials contained in petroleum fractions which comprises extracting the petroleum fractions with a selective solvent for naphthenic and phenolic materials, extracting the extract phase so obtained with alkali to produce naphthenates and phenolates, acidifying the resulting extract with a mineral acid, recovering the resultant oily layer with its contained naphthenic acids and phenols, neutralizing the oily layer to obtain naphthenates without neutralization of the phenols, recovering the resultant oily layer with its contained phenols and naphthenates and separating the phenols from the naphthenates.

DAVID R. MERRILL.
ARTHUR L. BLOUNT.